United States Patent
Dewhirst et al.

(10) Patent No.: US 8,392,740 B2
(45) Date of Patent: Mar. 5, 2013

(54) SYNCHRONIZATION OF CONVERTERS HAVING VARYING GROUP-DELAYS IN A MEASUREMENT SYSTEM

(75) Inventors: Adam H. Dewhirst, Austin, TX (US); Rafael Castro Scorsi, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 530 days.

(21) Appl. No.: 12/753,651

(22) Filed: Apr. 2, 2010

(65) Prior Publication Data

US 2011/0246809 A1    Oct. 6, 2011

(51) Int. Cl.
*G06F 1/12* (2006.01)
*G06F 13/42* (2006.01)
*H04L 5/00* (2006.01)
*H04L 7/00* (2006.01)

(52) U.S. Cl. ........ 713/400; 713/401; 713/500; 713/503; 341/126

(58) Field of Classification Search .................. 713/400, 713/401, 500, 503; 341/155
See application file for complete search history.

(56) References Cited

U.S. PATENT DOCUMENTS

| | | | |
|---|---|---|---|
| 7,414,562 B2 * | 8/2008 | Kok et al. | 341/155 |
| 7,728,753 B2 | 6/2010 | Taft et al. | |
| 7,772,928 B2 * | 8/2010 | Ortler | 331/2 |
| 7,825,839 B2 * | 11/2010 | Bratfisch et al. | 341/131 |
| 7,912,073 B2 * | 3/2011 | Miller | 370/395.62 |
| 7,948,423 B2 * | 5/2011 | Taft et al. | 341/155 |
| 8,102,171 B2 * | 1/2012 | Reichel et al. | 324/76.19 |
| 2002/0186795 A1 * | 12/2002 | Ohtaki | 375/340 |
| 2003/0038660 A1 * | 2/2003 | Dormitzer et al. | 327/156 |
| 2012/0099684 A1 * | 4/2012 | Coumou | 375/346 |

* cited by examiner

*Primary Examiner* — Jaweed A Abbaszadeh
(74) *Attorney, Agent, or Firm* — Meyertons Hood Kivlin Kowert & Goetzel, P.C.; Jeffrey C. Hood (57) ABSTRACT

An analog-to-digital-converter (ADC) timing engine may simplify the use of Delta-Sigma ADCs by compensating for the group-delay of the ADC. The compensation may render the group-delay corresponding to the ADC largely transparent to the end-user of the ADC. Therefore, multiple ADCs may be easily synchronized with each other, even if they have different group-delays, and they may further be synchronized with other types of ADCs that do not have group-delays. The data from the ADCs may also be synchronized with external events. The ADC timing engine (ATE) may be programmed with a number of parameters to set proper delays taking into account not only the group-delays corresponding to the various ADC, but delays stemming from a variety of other sources. Multiple ATEs may be synchronized with each other to ensure that data acquisition by the participating ADCs is started and/or stopped at the same point in time.

20 Claims, 9 Drawing Sheets

Configure ADC subsystems (boards) by specifying associated parameters such as ADC sampling frequency, acquisition period, etc., according to desired specifications.
902

Determine/calculate delay values based on system/subsystem component chracteristics/specifications and according to the specified parameters.
904

Program ATEs with the appropriate parameters and calculated delay values.
906

Generate a respective DDS clock in each ATE, derived from a common reference clock and according to the respective parameters programmed into the ATEs.
908

Designate a Master ATE device and synchronize the respective DDS clocks with respect to each other according to the delay values programmed into the ATEs.
910

Generate a respective Sample clock in each ATE in phase with the ATE's own DDS clock and synchronized with respect to the Sample clocks of other ATEs according to the respective delay values programmed into the ATEs and the respective parameters programmed into the ATEs.
912

Generate a respective internal Synchronization clock in each ATE in phase with the ATE's own Sample clock, with each Synchronization clock having a period that is a common multiple of the respective periods of all Sample clocks.
916

Designate a Master ATE device, and start/stop data acquisitions using trigger signals shared between the ATEs and synchronized between the ATEs using each ATE's internal Synchronization clock.
918

*FIG. 9*

SYNCHRONIZATION OF CONVERTERS HAVING VARYING GROUP-DELAYS IN A MEASUREMENT SYSTEM

FIELD OF THE INVENTION

The present invention relates to the field of signal distribution and synchronization in measurement and/or control systems, and more particularly to synchronizing converters with varying group-delay.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation.

The instrumentation hardware may be configured and controlled by software executing on a host computer system coupled to the system, or by a controller card installed in the chassis. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic, or straightforward. Instrumentation driver software provides a high-level interface to the operations of the instrumentation device. The instrumentation driver software may operate to configure the instrumentation device for communication with the host system and to initialize hardware and software to a known state. The instrumentation driver software may also maintain a soft copy of the state of the instrument and initiated operations. Further, the instrumentation driver software communicates over the bus to move the device from state to state and to respond to device requests.

In some cases, computerized instrumentation systems include several instrumentation and/or DAQ devices. Each device may generate and/or capture data based on a sampling clock. A sampling clock in this context is typically defined as a periodic electrical signal that controls a function. For example, the sampling clock on an arbitrary waveform generator may drive a DAC (Digital to Analog Converter). Two or more devices may be considered being digitally synchronized when their data capture and/or data generation circuits line up within a cycle of the sampling clock. Digital synchronization may occur when the respective sampling clock of each device to be synchronized has substantially the same frequency (e.g. the sampling clocks of the devices may experience instantaneous frequency differences, but on average they may not drift relative to each other). In addition, for digital synchronization, the devices to be synchronized would preferably have the ability to respond to a trigger within the same period of the sampling clock, and in the case these devices are output devices, to output their data to a connector at substantially the same time. As described herein, two clocks are considered to be in phase when they are measured as having substantially the same frequency and substantially zero degrees of phase difference. In general, distributed measurement and control systems often require their composite parts to be aligned to the same timebase. One useful result of synchronization in these applications is the sharing of synchronized periodic signals. The signals can be used to take measurements at the same time or to provide known relationships between control units in a distributed environment.

In some applications, multiple devices may be controlled by a single controller, where the devices can be made to appear as a single device as long as all devices can be triggered by the same signal. However, if each device has a separate trigger condition, it is not currently possible to combine the triggers asserted by the separate trigger conditions to create an integrated system trigger. This problem is compounded when the trigger conditions are temporary, such as a recognizing a digital pattern on a particular piece of data.

Figure 1A:
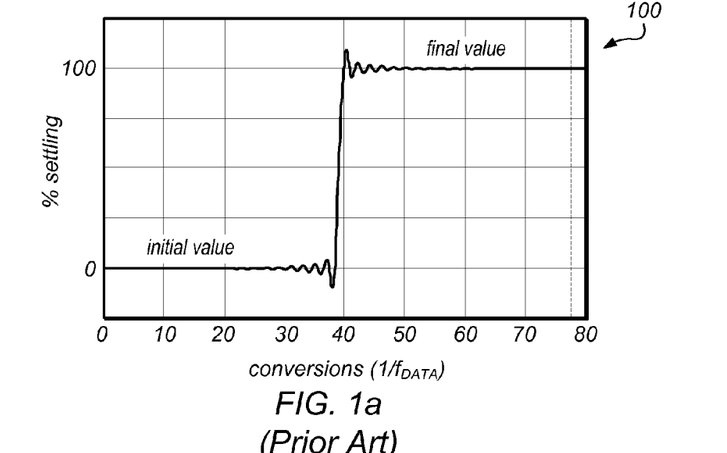
FIG. 1a shows a timing diagram illustrating the settling times for all power modes of a Delta-Sigma ADC, according to prior art.

One type of ADC commonly used in data acquisition systems is a Delta-Sigma ADC. Delta-Sigma converters work by oversampling an input signal to produce a high-speed stream of 1-bit samples that are subsequently sent to a digital filter. The filter then typically processes this high-speed data stream to produce high-resolution (e.g. 24-bit) samples at a lower rate. This scheme provides many advantages over other types of converters, including large dynamic range, low noise, good linearity, and rejection of out-of-band signals. Unfortunately, the operation of Delta-Sigma ADCs is typically characterized by a large "group-delay", which is defined as the amount of time it takes for an input signal applied to the input of the ADC to produce a corresponding change in output of the ADC, (in other words, a change in the digitized data provided by the ADC). One example of this group-delay is illustrated in FIG. 1a, which shows a graph 100 illustrating the settling time for all power modes of the Texas Instruments ADS1271 24-bit Delta-Sigma ADC. As shown in graph 100 of FIG. 1a, the result of a step being applied to the ADC input at time T0 does not result in an ADC output until approximately 39 samples later. In other words, 39 samples is the group-delay of this converter.

Figure 1B:
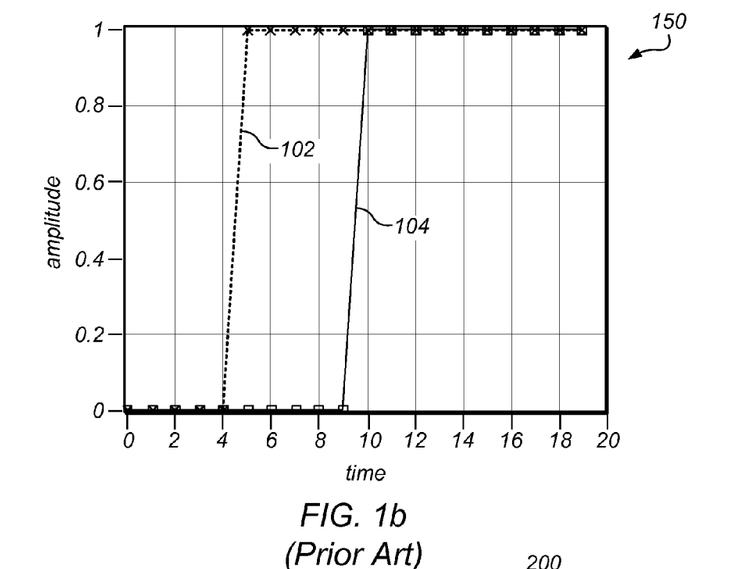
FIG. 1b shows a timing diagram illustrating the result of a step being applied to the input of a Delta-Sigma ADC at time zero, according to prior art.

All delta-sigma converters exhibit some group-delay. However, the group-delay is usually different for different converters. Furthermore, other types of analog-to-digital converters don't exhibit group-delay at all. For example, a Successive Approximation Register (SAR) converter can respond to a trigger signal and produce a conversion almost immediately in comparison to a Delta-Sigma converter. The group-delay can present significant issues in measurement systems that include converters having different group-delays. For example, if one converter has a group-delay of 5, and another converter has a group-delay of 10, they can return different outputs for the same input step. This is illustrated in graph 150 of FIG. 1b, where the same input step results in output signals 102 and 104 produced respectively by two different converters having different respective group-delays.

Figure 2:
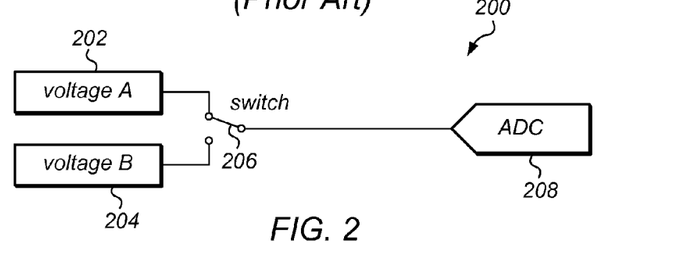
FIG. 2 shows a simple system that switches the output of a Delta-Sigma ADC between two acquisition points.

The presence of group-delay can therefore make it difficult to correlate data obtained from disparate converters, with external events. For example, an exemplary system 200 shown in FIG. 2 may include an ADC 208 having a significant group-delay. If system 200 were controlled such that switch 206 first coupled voltage A to ADC 208 to obtain a corresponding first output reading, then switch 206 was flipped, coupling voltage B to ADC 208 to obtain a corresponding second output reading, the second output reading would represent an incorrect value for voltage B. In other words, if the data returned by ADC 208 were read immediately after switch 206 was flipped, the wrong voltage value would be measured for voltage B, as ADC 208 would still continue to return a reading corresponding to voltage A until after the group-delay has elapsed. In order to obtain a correct reading for voltage B, the reading would have to be taken after a specific time period equivalent to at least the group-delay has elapsed, subsequent to flipping switch 206.

SUMMARY OF THE INVENTION

Various embodiments of the present invention simplify the use of Delta-Sigma analog-to-digital converters (ADCs) by compensating for the group-delay of the ADC. This compensation may render the group-delay of the ADC largely transparent to the end-user of the ADC. As a result, multiple ADCs may be easily synchronized, even if they have different group-delays. Delta-sigma ADCs may also be synchronized with other types of ADCs that do not have group-delays. In addition, the data from the ADCs may also be synchronized with external events.

In one set of embodiments, a combination of hardware and software may be configured to interface to a Delta-Sigma ADC while effectively masking the group-delay of that ADC from devices external to the ADC, or external to the system that contains the ADC. Various embodiments may support synchronizing with other Delta-Sigma ADCs regardless of their group-delays, synchronizing with other non-Delta-Sigma ADCs, correctly responding to external events (e.g. trigger signals, software commands, etc.) regardless of the group-delay, generating a sample clock corresponding to the actual sampling of the ADC analog input pins, and correctly generating trigger signals to external devices based on digitized ADC data regardless of the group-delay.

The group-delay compensation may be performed through the aid of an ADC Timing Engine (ATE), which may be aware of the group-delay associated with the ADC it is controlling. The ATE may provide the ADC with the clock and reset signals required to control the ADC. As a result, the ATE may recognize when the ADC is actually sampling signals (e.g. at its analog input), as well as when the corresponding digitized data is available at the ADC output. Internally, the ATE may have an "ADC Sample Clock Domain" and an "ADC Data Domain". All communication with devices that are external to the ADC may be performed in the "ADC Sample Clock Domain", which may be defined by an ADC Sample Clock generated and provided by the ATE. The Sample Clock may be asserted at specific points in time corresponding to the points in time when the ADC is actually sampling data (e.g. at its input pins). The rate at which the Sample Clock is asserted, i.e. the frequency of the Sample Clock may correspond to the data acquisition rate of the subsystem or board that includes the ADC. Any triggers to/from the external devices may be interpreted according to the Sample Clock. For example, an external "Start" trigger pulse to initiate data acquisition from the ADC may result in data being returned from the very next pulse or edge of the Sample Clock subsequent to when the trigger pulse was received. Thus, from the perspective of any device external to the ADC, there would be no group-delay associated with the ADC, since respective responses to trigger pulses may be provided on the very next edges of respective Sample Clock pulses that occur subsequent to receiving the trigger pulses.

The ATE may also feature an internal "ADC Data Domain" signal. This domain may correspond to the specific points in time when data from the ADC corresponding to a given acquisition actually becomes available. The ATE may be able to translate events in the "ADC Sample Clock Domain" to events in the "ADC Data Domain" by delaying the events occurring in the ADC sample clock domain based on the group-delay associated with the ADC. Thus, events in the Sample Clock Domain may be precisely captured in the Data Domain. As a result, the specific ADC group-delay may not be visible to the system user. In addition, the ATE may accept an external "Synchronization Signal" and "Reference Clock" for synchronizing with other ATEs. To synchronize two or more ATEs, they may be provided with identical "Reference Clock" signals, as well as with a "Synchronization Signal" that asserts at the same time for all the systems.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Various embodiments of a combination of hardware and software interfacing to a Delta-Sigma converter (Delta-Sigma ADC) may support synchronizing with other Delta-Sigma ADCs regardless of the group-delays of the Delta-Sigma ADCs, synchronizing with other non-Delta-Sigma ADCs, correctly responding to external events such as trigger signals and software commands regardless of the group-delay, generating a sample clock corresponding to the actual sampling of the ADC analog inputs, and correctly generating trigger signals to devices external to the Delta-Sigma ADC and/or external to the system with the Delta-Sigma ADC, based on digitized ADC data regardless of the group-delay.

Figure 3A:
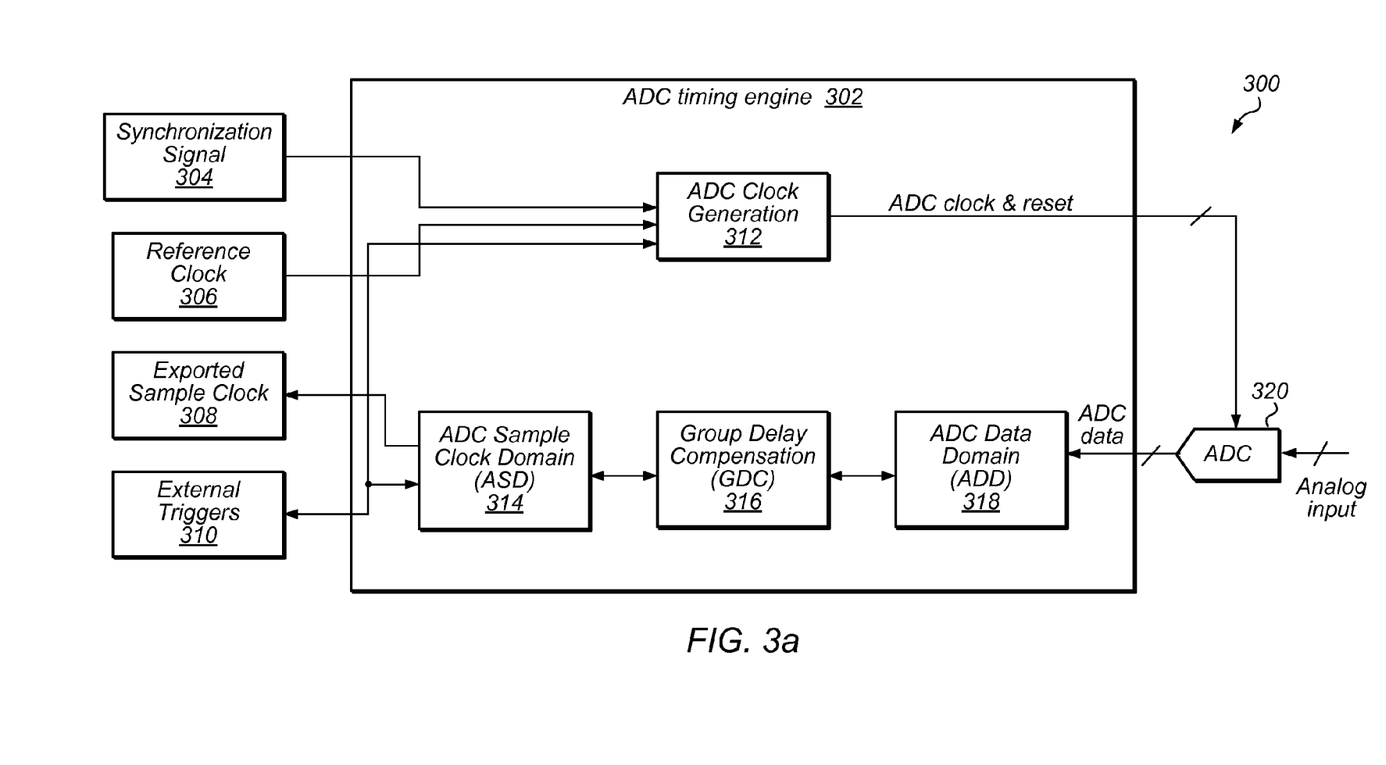
FIG. 3a shows a high-level block diagram of one embodiment of an ADC Timing Engine (ATE)

Turning now to FIG. 3a, group-delay compensation may be performed by an ADC Timing Engine (ATE) 302 interfacing with a [Delta-Sigma] ADC 320. ATE 302 may be aware of the group-delay associated with ADC 320, and may provide ADC 320 with the (oversampling) clock and reset signals required to control ADC 320. The ADC clock and reset signals may be generated in ADC clock generation block 312. ATE 302 may therefore recognize when ADC 320 is actually sampling its analog input, as well as when the corresponding digitized data is available at the output of ADC 320. ATE 302 may include an "ADC Sample Clock Domain" (ASD) 314 and an "ADC Data Domain" (ADD) 318, with a group-delay compensation (GDC) block 316 providing the interface/conversion between the two different clock domains. All or some of the communication with devices external to ADC 320 may be performed in ASD 314, which may be defined by a sample clock signal provided by ATE 302, and also exported outside ATE 302 as indicated by exported sample clock block 308. The sample clock signal may be asserted at a specific point in time corresponding to the point in time when ADC 320 actually samples its input. The rate at which the sample clock signal is asserted may correspond to the data acquisition rate of ADC 320, that is, the rate/frequency at which ADC 320 samples its analog input signal(s). Any triggers to/from the external devices may be interpreted according to the sample clock, as will be described in further detail below. For example, when ATE 302 receives an external "Start" trigger from external triggers 310 to initiate data acquisition for ADC 320, data may be returned at the very next sample clock pulse (triggered on the designated rising or falling edge of the pulse). Thus, from the perspective of any device external to ADC 320, no group-delay would have to be associated with ADC 320, since a response to the trigger signal may be provided on the very next edge of sample clock.

As mentioned above, ATE 302 may also feature an internal ADD 318. This domain may correspond to the specific points in time when data from ADC 320 actually becomes available. ATE 302 may translate events in ASD 314 to events in ADD 318 by delaying those events based on the group-delay. This delaying may be performed via GDC 316. Thus, events in ASD 314 may be precisely captured in ADD 318. As a result, the specific ADC group-delay may not be visible to the system user, that is, entities communicating with ADC 320 via ATE 302. In addition, ATE 302 may also receive an external synchronization signal 304 and a reference clock 306 for synchronizing with other similar ATEs, as will be described in further detail below. To synchronize two or more ATEs, each ATE may be provided with identical reference clock signals, and respective synchronization pulses that may be generated at the same time (e.g. simultaneously) for all the ATEs, which will also be described in further detail below.

Figure 3B:
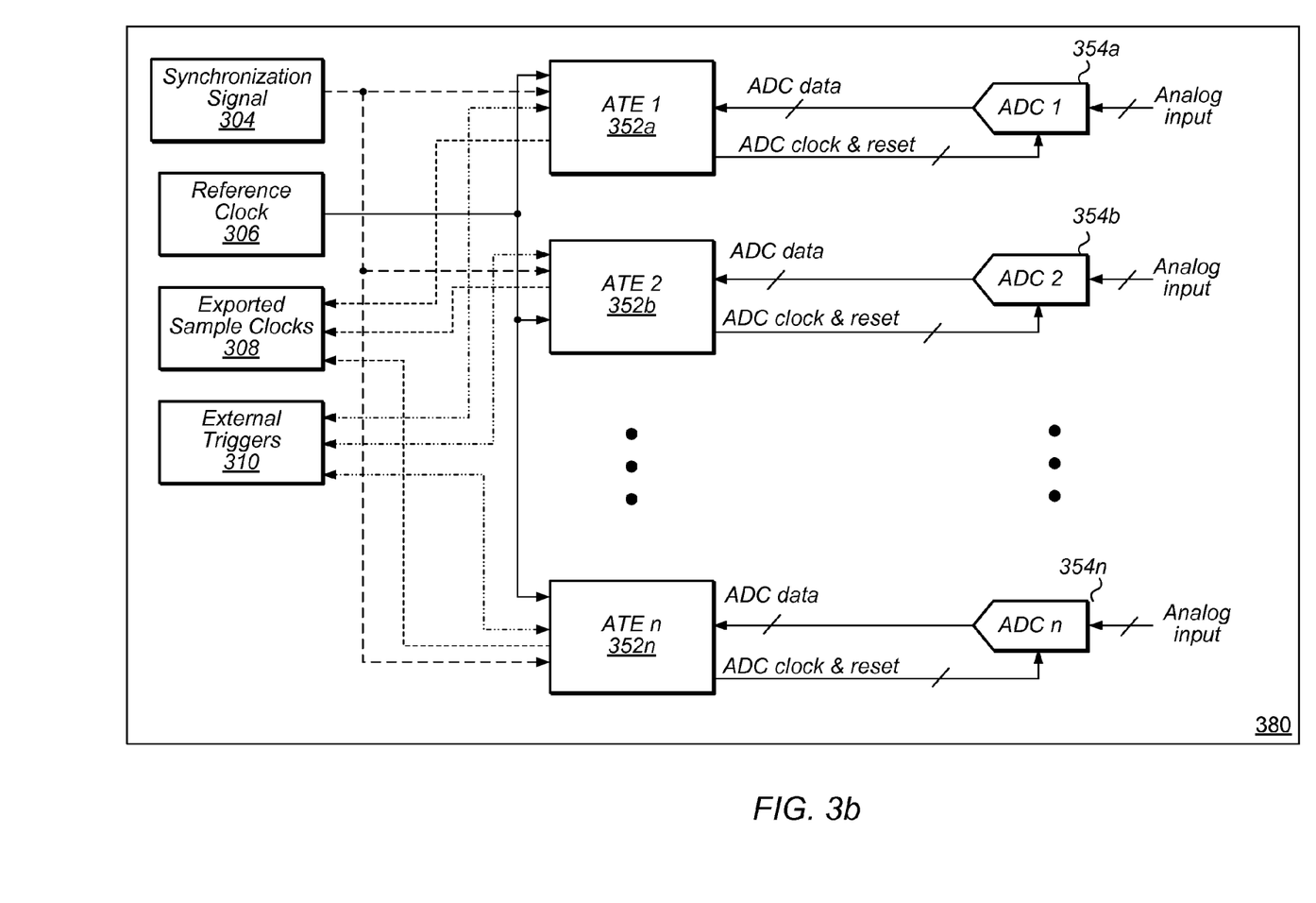
FIG. 3b shows one embodiment of a system that includes multiple ATEs and corresponding ADCs.

One example of a system 380 with multiple ADCs (354a/b/n, collectively referred to as 354) and ATEs (352a/b/n, collectively referred to as 352) is shown in FIG. 3b. As shown, each one of ADCs 354 may be controlled by a respective one of ATEs 352. Alternate embodiments may include ATEs 352 rolled into a single ATE to control each one of ADCs 354, with the single ATE internally organized according to the principles described above, and as will be described in further detail below. In one set of embodiments, system 380 may represent a chassis containing multiple DAQ boards, where each DAQ board includes a respective one of ATEs 352 and the corresponding ADC controlled by the respective ATE. For example, one DAQ board may contain ATE 352b and ADC 354b, another DAQ board may include ATE 352a and ADC 354a, and so on. Blocks 304, 306, 308, and 310 may represent signals routed along the backplane of the chassis and distributed to/from all the boards. Thus, the same reference clock 306 may be provided to each one of ATEs 352, each of which may generate and/or receive respective triggers (trigger signals) via block 310, and may export respective sample clocks via block 308. Each one of ATEs 352 may also receive a respective synchronization signal via block 304. The letter "n" denotes an integer representative of the total number of respective ATE and ADC units that may be included in the particular system.

The trigger signal (via block 310) may be part of a synchronization mechanism to share triggers between devices, e.g. between ATEs 352 (and consequently between ADCs 354), to allow all devices to act upon the trigger at a scheduled time in the future. Such synchronization may be performed by sharing a clock signal that is in phase on all the devices, and a periodic synchronization signal that is common to all devices, as mentioned above. For the system shown in FIG. 3b, Delta-Sigma ADCs 354 may be synchronized via ATEs 352, by using respective sample clocks generated by ATEs 352 (exported via block 308). In this case, the synchronization may rely on the respective sample clocks of ATEs 352 to be aligned by a previous synchronization. ATEs 352 may also be synchronized with other non-ATE devices through the use of the ATE devices' respective sample clocks via block 308. Embodiments of the various synchronization methods and steps will be described in further detail below with reference to more detailed embodiments of ATEs 352.

Detailed Embodiment of an ATE

Figure 4:
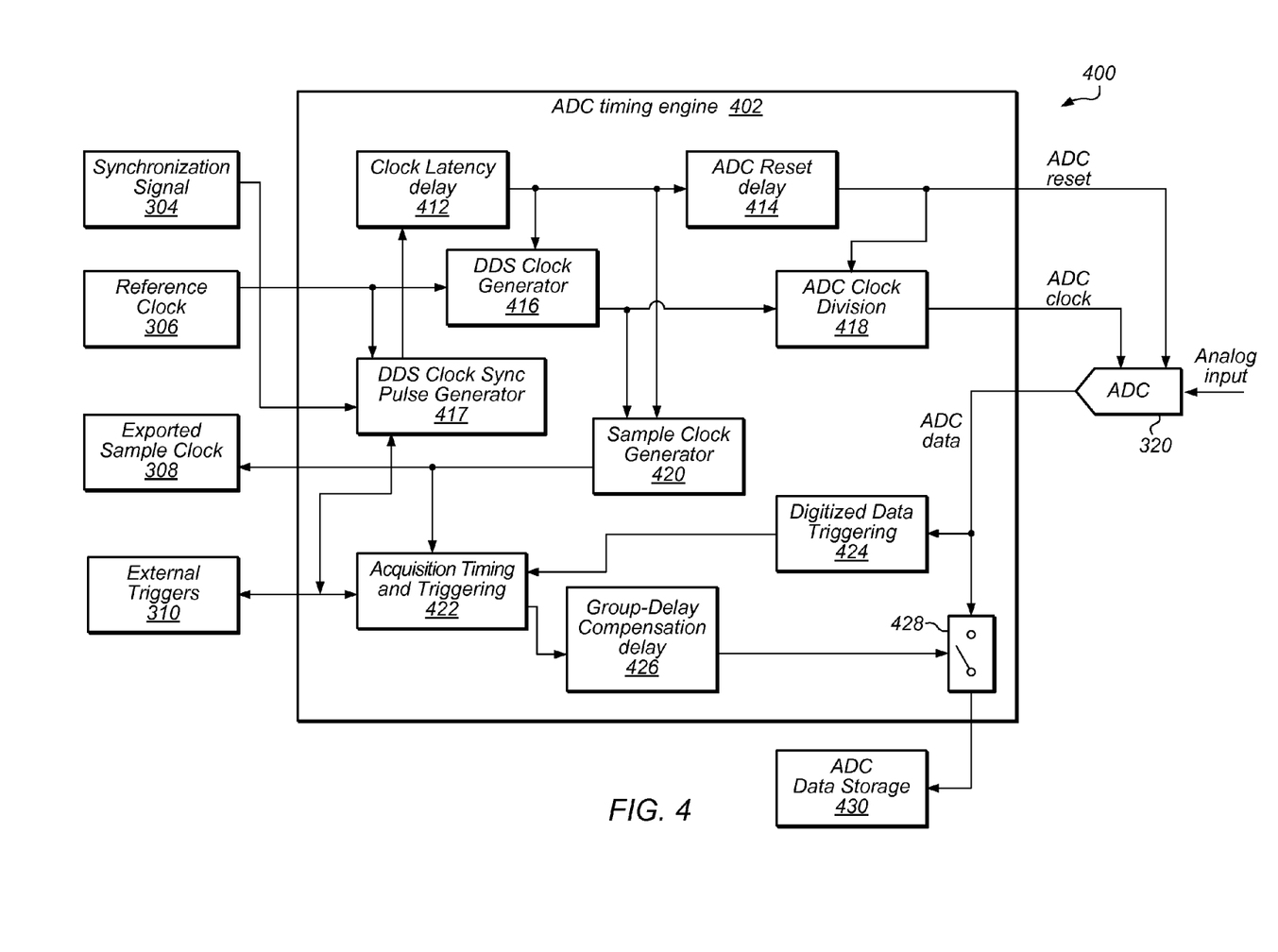
FIG. 4 shows a more detailed diagram of one embodiment of an ATE.

To provide a more detailed explanation of various embodiments of the synchronization methods disclosed herein, FIG. 4 shows a block diagram of a system 400 that includes a more detailed view of one embodiment of an ATE 402. For example, ATE 402 may be one embodiment of ATE 302 from FIG. 3a, or of any one or more of ATEs 352 from FIG. 3b. ATE 402 may include a Direct Digital Synthesis (DDS) clock generator 416, which may generate an output clock (DDS clock) based on a received reference clock 306 which is the same clock provided to all ATE devices (as described above, reference clock 306 may be a common backplane clock in a chassis). The DDS clock may then be used by ADC clock division block 418 to derive the ADC clock supplied to ADC 320. A DDS clock generator is preferable because it is capable of generating clocks (clock signals) with very flexible frequency resolution. However, other clock generation techniques may also be used to obtain an oversampling clock (signal) from which the ADC clock may be generated. For example, alternate embodiments may generate the clock signal provided to ADC clock division block 418 via simple clock division, based directly on the reference clock, or by other similar means.

ATE 402 may also include a clock latency delay 412. When attempting to synchronize two different devices (e.g. two different ATEs), each of those devices may be generating a respective DDS clock using its own DDS clock generation circuitry, which may result in the respective DDS clock signals being unaligned with respect to each other. Clock latency delay 412 in one of the devices may be programmed with a value representative of the delay between the respective DDS clock signals, to ensure that the respective DDS clock signals line up with respect to each other. ADC clock division block 418 may operate to programmatically divide down the DDS clock to produce the correct frequency ADC clock required for ADC 320 to sample at the desired data acquisition rate. ADC reset delay block 414 may be programmed to have all the different ADCs (which are to be synchronized) in the system sample their respective analog input(s) at the same point in time. Sample clock generator 420 may produce a sample clock signal corresponding to, or representative of the point(s) in time when ADC 320 is actually sampling its analog inputs. Sample clock generator 420, ADC reset delay block 414, and DDS clock generator block 416 may all be controlled by the output of clock latency delay block 412. When synchronizing multiple ADCs, the system(s) including respective instances of ATE 402 corresponding to the ADCs may be programmed such that all respective sample clocks in the multiple systems are aligned with respect to each other, and running at the same relative rate (i.e. the exact same rate, or integer multiple rates of each other, such as 2×, 3×, etc.)

ATE 402 may also feature a digitized data triggering block 424, which may receive the digitized data from ADC 320. Block 424 may be programmed to generate a trigger event based on the data received from ADC 320. For example, triggering may be performed on a rising-edge. Acquisition timing and triggering block 422 may be similar to what may be included in any data acquisition device, and may handle basic acquisition timing and trigger tasks. One example of such a task would be: waiting for a 'Start' trigger, acquiring a specified number of samples upon receiving the "start" trigger-pulse, and stopping subsequent to having acquired the specified number of samples, which may happen upon receiving a "stop" trigger-pulse. Delay by group-delay block 426 may take control signals from acquisition timing and triggering block 422, and delay those control signals by a delay corresponding to the group-delay associated with ADC 320. For example, when an acquisition starts or stops, block 426 may wait for a time period corresponding to the group-delay (e.g. a time period that equals the group-delay of ADC 320) before starting/stopping the storage of ADC data, thus compensating for the group-delay. ADC data storage block 430 may be used as the final destination for the acquired data. Block 426 may operate switch 428 to acquire the data presented at the output of ADC 320 at the proper point in time, and thus store the acquired data in ADC data storage block 430. This may involve storing the acquired digitized data locally, transferring it across a bus or network, or displaying the acquired data. That is, closing switch 428 may result in any one or more of the above listed events. How and where the acquired data is finally stored may vary depending on the system, and is not meant to be limited to those options listed above.

Synchronizing the DDS Clocks

Figure 5:
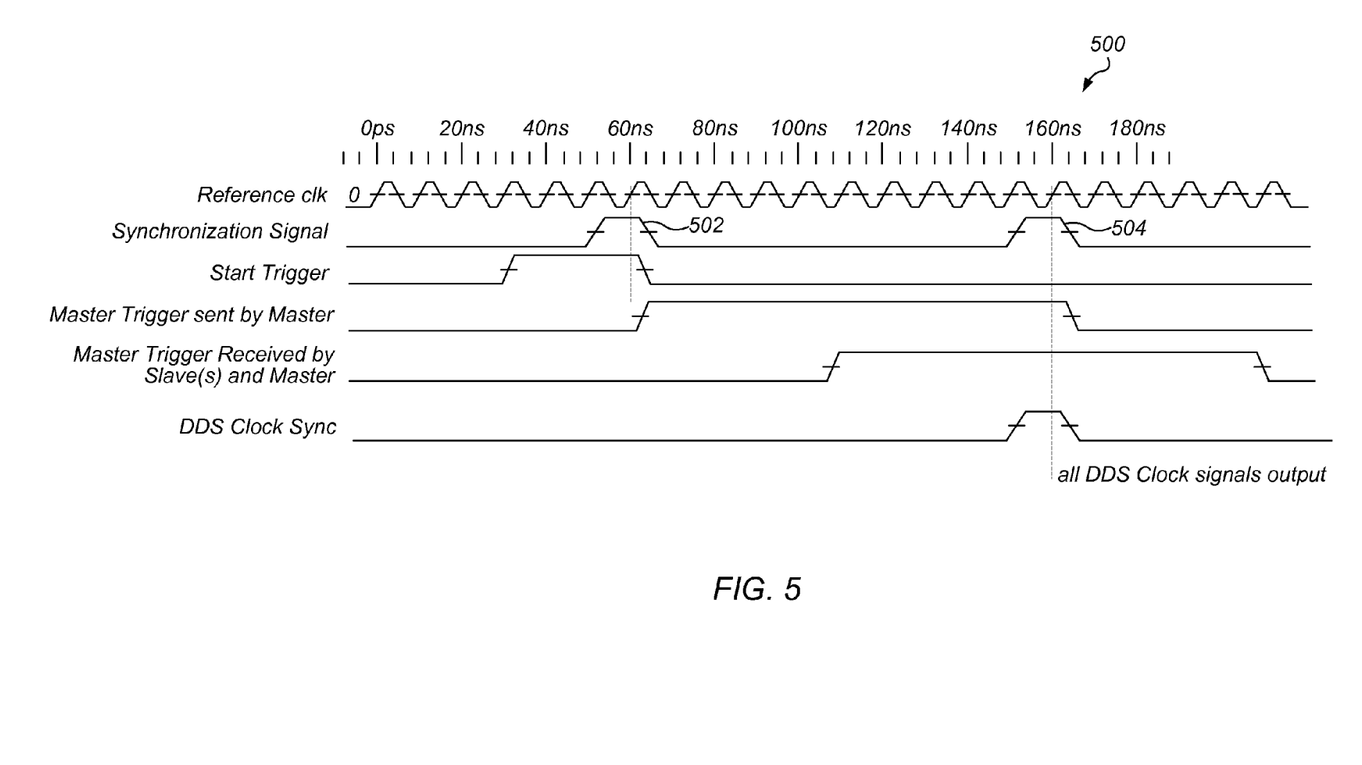
FIG. 5 shows a timing diagram illustrating DDS clock synchronization according to one embodiment.

ATE 402 may include a DDS clock sync pulse generator block 417 used to synchronize the respective DDS clocks generated by different ATEs. For example, referencing FIG. 3b, each respective ATE 352 may include a DDS clock sync pulse generator block 417 for the purpose of synchronizing the DDS clock generated by the DDS clock generator 416 included in the respective ATE 352. FIG. 5 shows a timing diagram 500 illustrating the relationships of various signals involved in DDS clock synchronization, according to one embodiment. Prior to beginning the synchronization of the clocks, the system (e.g. system 380 in FIG. 4) may be configured according to the desired specifications. For example, various parameters, such as the desired ADC sampling frequencies, acquisition periods, etc., may be defined to setup operation of the system. Once the system parameters have been specified, the various required delay values may be determined/calculated, and programmed. For example, clock latency delay (412 in FIG. 4), the ADC reset delay (414 in FIG. 4), and group-delay compensation (426 in FIG. 4) may all be programmed with the calculated/determined respective values in all ATEs 352. The actual number of parameters corresponding to each of the above mentioned blocks may actually vary, as will be further described below, and may depend on the system requirements and configuration. Depending on the configuration and actual components of each subsystem (or board) that includes a respective one of ATEs 352 and ADCs 354, the values for each parameter type (e.g. clock latency delay may be considered as one parameter type) may be different between different ATEs. The various delay blocks in FIG. 4 may be implemented as counters, with the programmed count value corresponding to the appropriate parameter value or values.

Once the appropriate parameters have been set in the system and programmed in each respective ATE, one of ATEs 352 may be designated as a master ATE, and the remaining ATEs may be designated as slave ATEs for the purpose of synchronizing the respective DDS clocks and sample clocks of the respective ATEs with respect to each other. Synchronization may begin with the issuing of a start trigger pulse ("Start Trigger", in FIG. 5) through trigger block 310 to the designated master ATE. The start trigger pulse may be issued in response to a user command or at a preprogrammed time, or in any other manner as desired. All ATEs, including the master ATE and slave ATEs, may be provided the reference clock (306; "Reference clk", in FIG. 5), and a common synchronization signal (304; "Synchronization Signal", in FIG. 5) having a period that is a multiple of the period of the reference clock, and is in phase with the reference clock. Upon receiving the start trigger pulse through block 310, the DDS clock sync pulse generator block 417 of the master ATE may issue a master trigger pulse ("Master Trigger Sent by Master", in FIG. 5) at the next pulse of synchronization signal 304 (pulse 502, in FIG. 5), and provide the master trigger pulse to all slave ATEs through trigger block 310. Thus, each slave ATE may receive the master trigger pulse via trigger block 310 ("Master Trigger received by Slave(s)" in FIG. 5). The width of the master trigger pulse may be sufficient to allow each slave ATE to receive the master trigger pulse before a next pulse of synchronization signal 304. At the next pulse of synchronization signal 304 (pulse 504, in FIG. 5), the respective DDS clock sync pulse generator block 417 of each slave ATE and the master ATE may issue a synchronization pulse ("DDS Clock Sync", in FIG. 5) to its respective clock latency delay block (412), which may in turn activate each respective block 412 at the same point in time for all ATE devices. Since clock latency delay block 412 is programmed for each ATE device according to the differences between the different ATE devices, the above sequence will result in the respective clock latency delay blocks 412 enabling the output of the respective DDS clock generator 416 of each ATE device (including the master ATE) at the same point in time. The respective DDS clocks of all ATE devices will therefore be synchronized (in phase) with respect to each other. It should also be noted that while DDS clock sync generator 416 is shown as part of the ATE, in alternate embodiments the synchronization pulse provided by block 417 to clock latency delay block 412 may be generated (as described above) external to the ATE, and provided to ATE as an external synchronization pulse.

Synchronizing the Sample Clocks

The process of synchronizing the respective sample clocks may involve resetting the respective ADCs (such as ADCs 354 in system 380) at a specific point in time, such that all ADCs sample their respective inputs at the same time. For example, in the system of FIG. 3b, ADCs 354 would all be reset at a specific point in time to have ADCs 354 sample their respective analog inputs at the same time. This may compensate for possible differences in group-delays between the different ADCs configured on different boards, and may effectively correlate in time the acquired data. The sample time, or sampling time of the Delta-Sigma ADC may be defined as the center of the averaging window of the Delta-Sigma ADC. This step may be performed following the DDS clock synchronization described above.

Figure 6:
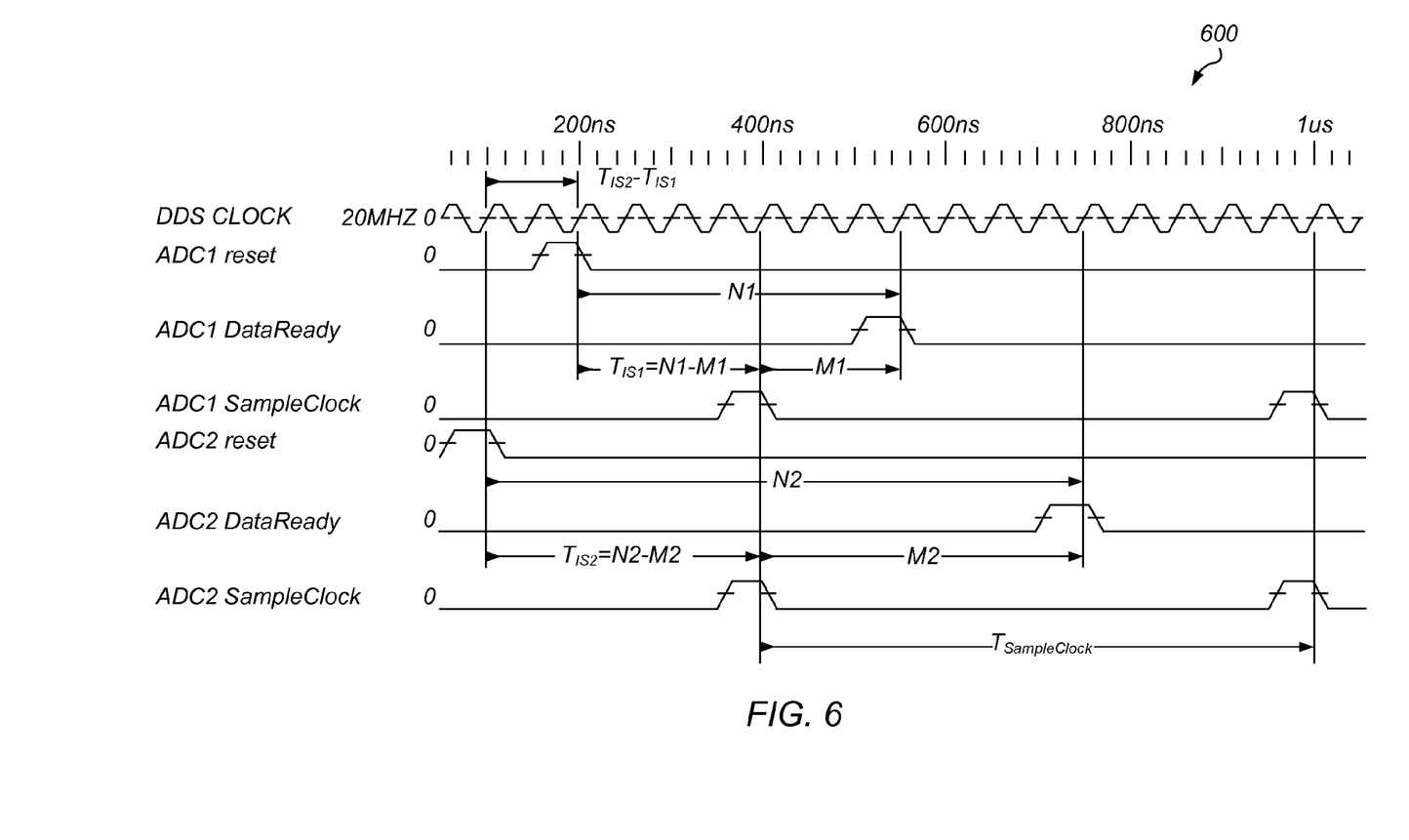
FIG. 6 shows a timing diagram illustrating sample clock synchronization according tot one embodiment.

In general, Delta-Sigma ADCs may require a number of clock cycles (N) from exiting reset, or from receiving a synchronization pulse, until the point in time when they return the first data sample. (ADC reset delay block 414 may be programmed to take into account the possible difference in the reset delay values, or initial latencies, of the different ADCs 354 in system 380). In addition, the ADC may have a group-delay in clock cycles (M) that represents the time it takes for a signal to propagate through its pipeline (group-delay block 426 may be programmed to take into account this group-delay, including the possible difference in the group-delay values of the different ADCs 354 in system 380). Thus, an ADC that leaves the initial state at time 0 may return its first data sample at clock cycle N. Accordingly, the returned data may correspond to the data that was sampled at the point in time defined as $T_{IS}=N-M$. In order to align the sample clocks, the reset signals provided to the ADCs (that is, the time when a respective reset signal to the ADC is asserted) would have to be out of phase with respect to each other by the difference in their times to initial sample time $T_{IS}$. FIG. 6 shows a timing diagram 600 illustrating the relationship between two ADCs (e.g. ADC 354a and ADC 354b) having different respective initial latencies and group-delays, and the synchronization of the respective ADC sample clocks generated by the respective sample clock generators 420 of the corresponding ATEs.

Synchronization for multiple different kinds of Delta-Sigma ADCs may be accomplished by calculating the correct sequence of the resets. This calculation may be performed in software or hardware or a combination of both. In one set of embodiments, each device (i.e. each ATE associated with a respective ADC, e.g. as shown in FIG. 3b) may have a counter (ADC reset delay 414, or block 414) that starts counting at a specific point in time referenced from the point in time when the DDS clock generator (e.g. block 416 in FIG. 4) begins outputting its DDS clock signal. The respective counters (block 414) on all devices may start at precisely the same time. Each counter may count the programmed delay, and once the end of the count has been reached, the ATE may generate the reset pulse for its respective ADC. From this point, the counter may count N-M cycles, and once the count has been reached, instruct sample clock generator 420 start outputting a periodic sample clock (based on the DDS clock) that may be used as a timing reference in the ADC sample clock domain. The goal is for the sum of $T_{IS}$ and the delay from time 0 to the reset pulse (provided to the ADC) to be the same for all devices.

As seen in timing diagram 600, ADC1 requires N1 clock cycles (of DDS clock) from when ADC1 is reset to when ADC1 is ready to return its first data sample. Similarly, ADC2 requires N2 clock cycles (of DDS clock) from when ADC2 is reset to when ADC2 is ready to return its first data sample. Of the N1 clock cycles, M1 clock cycles represent the group-delay of ADC1 (or group-delay corresponding to ADC1), and of the N2 clock cycles, M2 clock cycles represent the group-delay of ADC2 (or group-delay corresponding to ADC2). As shown in the example, if ADC2 is reset at time 0, and ADC1 is reset at time $T_{IS2}-T_{IS1}$ after time 0, the respective sample clocks for the ADCs, i.e. ADC1 Sample Clock and ADC2 Sample Clock may be aligned.

In summary, the sample clocks may be synchronized by adjusting at least three parameters. The three parameters may be programmable, and may be stored in the appropriate portion of ATE 402. The value of the first parameter may determine the delay from the point in time when the synchronization pulse has been generated/issued by DDS clock sync pulse generator 417, to the point in time when the reset is asserted/issued to the ADC. This value may compensate for the different respective reset latencies of the ADCs involved in the data acquisition, and may be provided to or programmed into ADC reset delay block 414. Therefore, the first parameter for the board/subsystem having an ADC with the lowest latency may be programmed with a larger number, and the first parameter for the board/subsystem having an ADC with the highest latency may be programmed with a smaller number. The goal is to align the center of the sampling windows of all ADCs. In addition to responding to the different ADC reset latencies, this delay may also ensure that a minimum number of DDS clock cycles have elapsed before the ADC is reset, allowing time for certain events to complete, e.g. for an external PLL (phase-locked loop) to lock on its designated frequency. Each system featuring multiple ADCs may have a designated minimum value for the first parameter, and that minimum value may be used by the calculating entity (e.g. software) to determine the appropriate value to use when synchronizing multiple devices. The value of the second parameter may determine the delay from the point in time when the reset pulse is asserted to the point in time when the first sample clock pulse is generated/output. The value for the second parameter may usually be the difference between the time the ADC takes to initialize after it has received a reset pulse, and the analog front-end delay, and may be provided to or programmed into clock latency delay block 412. If the analog front-end delay is longer than the ADC initialization time, the value for the second parameter may be increased by multiples of the ADC group-delay. The value of the third parameter may be used to set the period for the sample clock, which may be provided to or programmed into sample clock generator 420.

Sample Clock and Synchronization Clock

Once the DDS clocks and sample clocks have been synchronized, it may be possible to synchronize multiple subsystems/boards, each including a respective ADC, running at different sampling rates (as previously noted, each ATE/ADC pair in FIG. 3b may be configured on a corresponding respective board in system/chassis 380). The sample clocks generated by the different ATEs may ultimately be related because their respective periods may be integer multiples of the fastest DDS clock. In order to share trigger pulses between the different subsystems/boards, each ATE may need to generate a signal that is in phase with its respective sample clock and has a period that is a common multiple of the respective sample clocks of all the boards, preferably the least common multiple (LCM) of the respective sample clocks of all the boards. This clock signal may be referred to as the synchronization clock, or sync clock.

Figure 7:
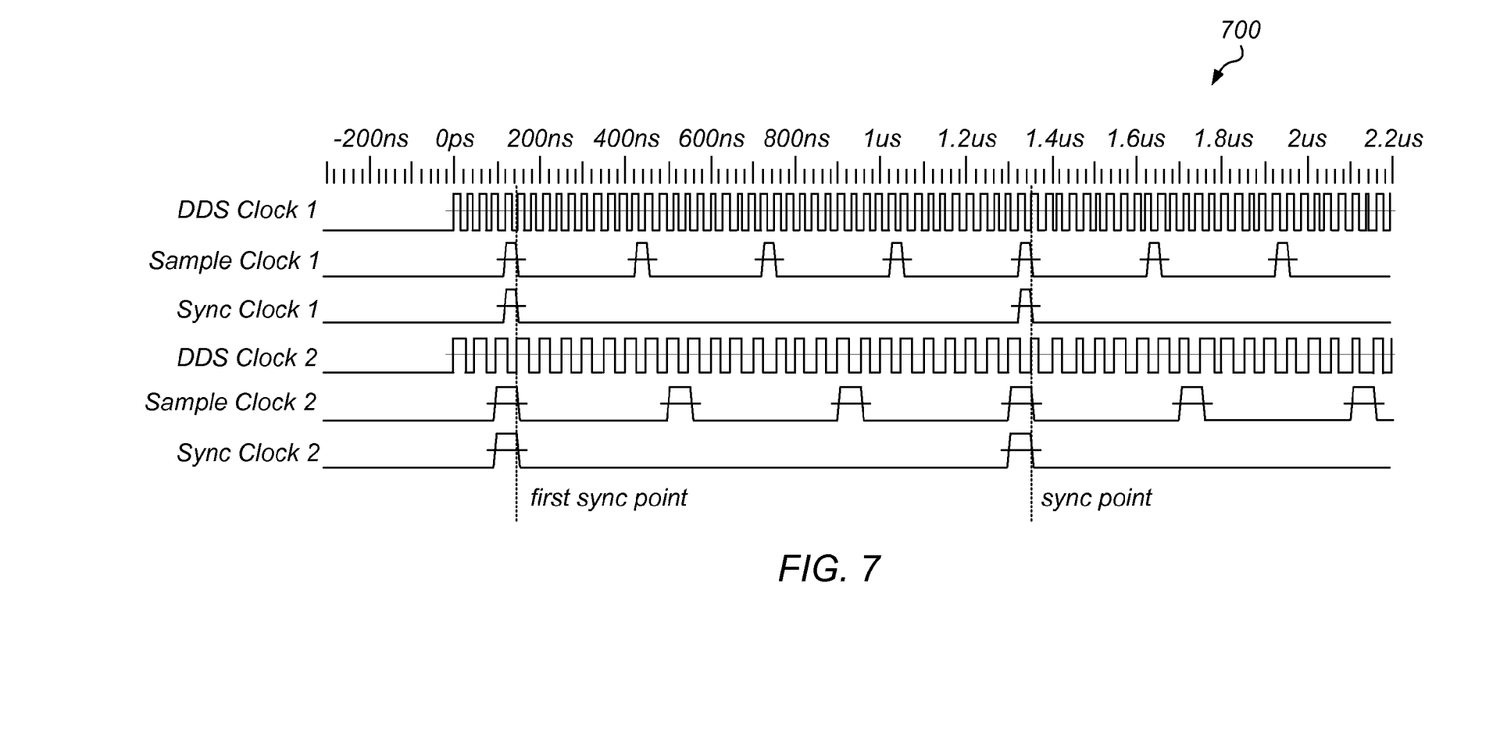
FIG. 7 shows a timing diagram illustrating the timing relationships between sample clocks and synchronization clocks according to one embodiment.

When all the boards are running at the same sample clock rate, the synchronization clock may be equivalent to the sample clock. More broadly, the synchronization clock may represent the points in time when the sampling of the respective analog signals by the different ADCs is aligned between all ADCs. FIG. 7 shows a timing diagram 700 illustrating the relationship between the sample clocks and synchronization clocks for two different pairs of ATE/ADC. For example, the number '1' at the end of the signal names may indicate that those signals correspond to ATE 352a and ADC 354a in FIG. 3b, and the number '2' at the end of the signal names may indicate that those signals correspond to ATE 352b and ADC 354b in FIG. 3b. As seen in timing diagram 700, DDS Clock 1 is in phase with DDS Clock 2, and Sample Clock 1 is in phase with Sample Clock 2, although the two sample clock signals have different frequencies. Sync Clock 1 and Sync Clock 2 may be generated based on Sample Clock 1 and Sample Clock 2, respectively, and have the same frequency, being essentially identical with respect to each other.

The generation of the synchronization clock signal may be controlled by a fourth parameter, which may determine the synchronization clock interval, or the period of the synchronization clock. The programmed value of the fourth parameter may be in units of sample clock periods, and may be provided to or programmed into each acquisition timing and triggering block 422 to result in the proper common sync clock frequency. A value of zero may be set if the synchronization clock pulse is to be asserted on every pulse of sample clock. The sync clock allows all the ADCs in the system to sample at different sampling rates, yet ensure that all ADCs begin and/or end sampling at the same point in time.

Sharing Triggers Using Master-Slave Synchronization

Figure 8:
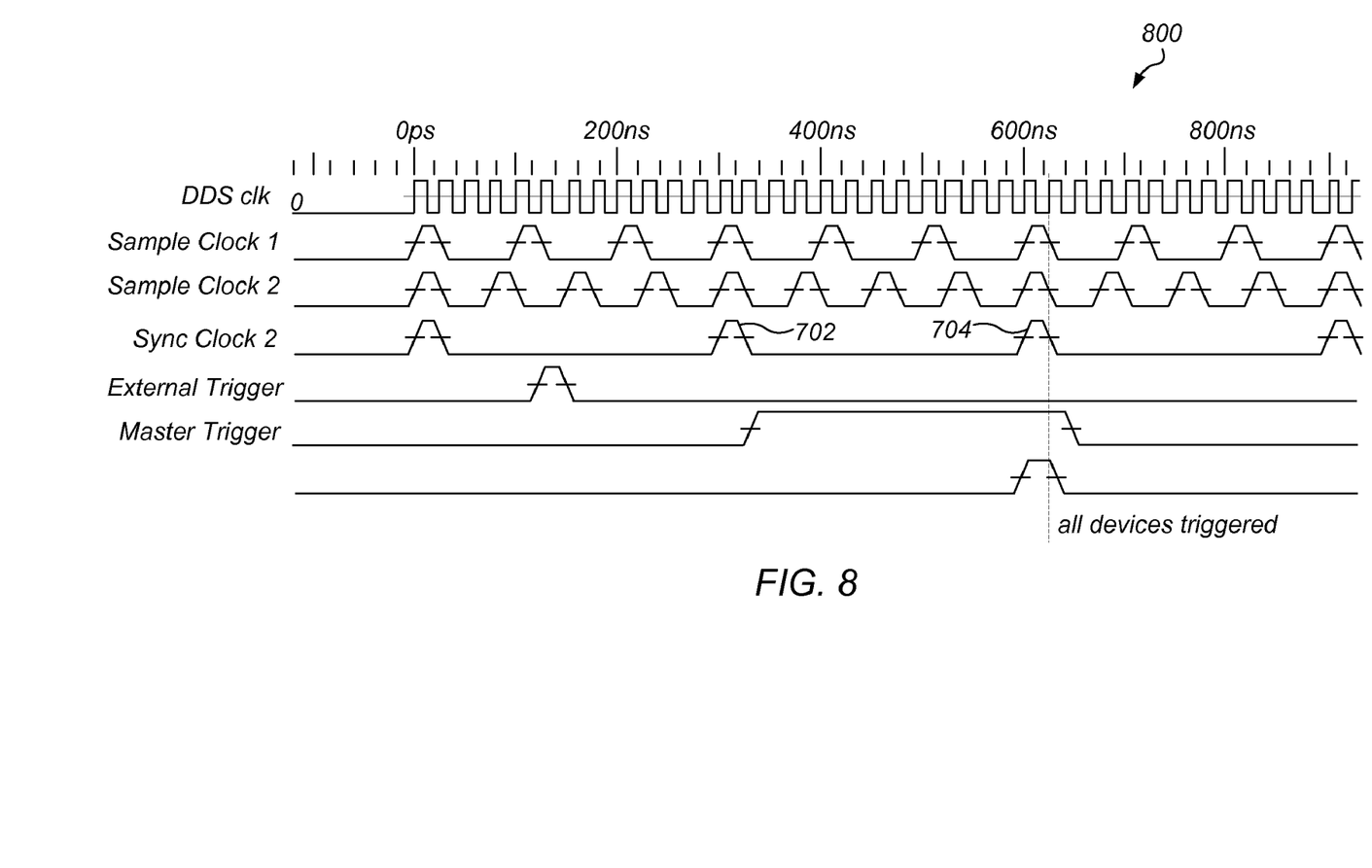
FIG. 8 shows a timing diagram illustrating synchronization of a shared trigger pulse according to one embodiment.

Once the sample clocks have been synchronized, the different pairs of ATE/ADC devices may share Start or Reference trigger pulses using the synchronization clock as the synchronizing pulse. In other words, once the sample clocks have been synchronized, it is possible to use a single start and/or stop trigger pulse to have all ADCs start sampling and/or stop sampling at the same point in time. To share a trigger pulse relating to data acquisition, one of the ATE devices may again be designated as a master ATE. Timing diagram 800 in FIG. 8 shows the timing relationship between the signals involved in starting/stopping data acquisition based on an external trigger pulse (External Trigger). Sample Clock 1 is shown to show the timing relationship between the signals of a slave ATE (1) and the master ATE. The master ATE may receive External Trigger (via block 310) into its acquisition timing and triggering block 422, where master ATE may generate Sync Clock 2 based on Sample Clock 2, received from sample clock generator block 420. Upon receiving the External Trigger, the master ATE may send out a corresponding Master Trigger pulse on the next pulse (702) of Sync Clock 2. The slave ATEs may receive the Master Trigger via block 310, and all ATE devices, including the master ATE, may trigger on the next pulse (704) of Sync Clock 2. This way, acquisition may be started and/or ended at the same point in time, using a single external trigger signal.

Crossing from the Sample Domain to the Data Domain

Events occurring in the ADC sample clock domain (ASD—see block 314 in FIG. 3a) may need to be cleanly crossed to the ADC data domain (ADD—see to block 314 in FIG. 3a). For example, when a Start trigger pulse is received, the ATE may need to generate a delayed version of this event in the ADD to enable the storing of ADC data, that is, sample data provided by the ADC. By delaying this event, the ATE may account for the group-delay of the system (the group-delay of the ADC, plus any additional processing delays that may occur outside the ADC before the sample data may reach its intended destination). This domain crossing may be performed such that there is no uncertainty regarding which sample is the intended sample in the ADD. The group-delay compensation block 426 within the ATE may be provided or programmed with a fifth and a sixth parameter to set the appropriate delay on events in the ASD, in order to translate those events to the ADD. The fifth parameter may be used to specify the portion of the delay to be counted in cycles of the DDS clock. This may take into account the group-delay of the ADC as well as any portion of the time required to shift data out of the ADC, where the shifting of the data is performed based on the DDS clock. Furthermore, any analog signal conditioning circuitry placed in front of the ADC (e.g. inside the ATE) may effectively add to the group-delay associated with the ADC, and this added delay may be compensated for as well.

The sixth parameter may be used to specify the portion of the delay to be counted in cycles of the onboard oscillator or other clock source used to transfer data out of the ATE, e.g. to a host device. This may be taken into account to compensate for the portion of the group-delay resulting from other logic operating according to the onboard oscillator or other clock, to perform additional operations such as calibration and filtering, for example. In other words, there may be additional logic (not shown) along the ADC data path between ADC (320) and switch (428), for example. The additional logic may likely take a fixed amount of time to operate on the data, for example, calibrating the data may take 20 clock cycles. The sixth parameter may be determined to take into account other processing delays unrelated to the ADC group-delay. In one set of embodiments, the hardware may be designed such that the ATE plus a small portion of the ADC interface logic is actually running on the DDS clock, while the rest of the hardware may be running off of a fixed-frequency onboard oscillator. One example of another clock source may be a second clock received through the data bus. This clock may be different from the DDS clock, and may be dictated by a bus standard, such as PCI or USB, for example, and data may be transferred based on this clock.

Crossing from the Data Domain to the Sample Domain

Events occurring in the ADD may also need to be cleanly crossed to the ASD. For example, when an analog trigger pulse is generated in the ADD, a corresponding trigger pulse may need to be generated in the ASD. Events in the ADD may be delayed in time with respect to the ASD. However, when crossing from the ADD to the ASD, it may not be possible to implement a negative delay. Therefore, crossing from the ADD to the ASD may be implemented using a positive delay, which may ensure that events from the ADD cross to the ASD without any uncertainty. The group-delay delay block 426 in the ATE may also be provided or programmed with a seventh parameter, which may be used to set the number of DDS clock cycles by which to delay an event that occurs in the ADD before that event may cross over to the ASD.

Decimation and Filters

Various embodiments may include digital filters and decimation filters coupled to the output of the ADC. A filter may add to the system group-delay, and may therefore be considered in conjunction with the ADC group and reset delays. A decimation filter may introduce group-delay and may modify the overall sample clock rate. The sample clock alignment may therefore need to take both factors into consideration in addition to the group-delay of the ADC.

Analog Trigger

Various embodiments may operate with an analog trigger from inspection of the signal at the analog front end. For example, the analog trigger may be generated using analog comparators and the analog data at the Analog input of ADC 320. Other embodiments may operate with an analog trigger generated (by digitized data triggering block 424) from inspection of the digitized ADC data out. When the analog trigger is generated from analog inspection at the front end, then the analog trigger signal will already be in the ASD, and may be used as any other external trigger. It may be synchronized and converted to the ADD, resulting in the acquired sample data corresponding in time to the point in time when the analog event occurred. Alternatively, analog trigger pulses generated in the ADD from digitized data (e.g. by block 424) may be delayed in time from the point in time when the analog waveform was generated, by an amount corresponding to the group-delay. This may pose a problem at the time of sharing the trigger pulse with other devices having different group-delays. If all the devices started using the trigger pulse immediately, their waveforms may be out of phase by the difference in group-delays. In certain extreme cases, for example when the Delta-Sigma ADC is sharing the analog trigger with a board also containing one or more devices having no group delay, e.g. successive approximation register (SAR) type ADCs with no group-delay, the Delta-Sigma ADCs may be out of phase with respect to the other devices by the full group-delay.

In order to easily share an analog trigger generated in the ADD, all devices may correlate the trigger again in the ASD, and convert it back to the ADD. This may result in the correlation (in time) of all devices using this trigger, but it may also have the effect of delaying the response time to the trigger pulse by the group-delay. One possible way of compensating for this may be for the user to perform a pre-trigger acquisition with enough data-points prior to the trigger pulse to include the trigger point. In other words, at least a number of points equivalent to the group-delay number may be acquired prior to the trigger event, ensuring that all expected data-points from the trigger event are acquired, including the data-points that caused the trigger event. Another possible way of compensating may be to configure the ATE to hide the effect of the group delay on the trigger. In one set of embodiments, this may be achieved by altering the desired number of pre-trigger and post-trigger data-points. The ATE may be configured and/or programmed to add a specified number of data-points to the desired number of pre-trigger data-points, and subtract the specified number of data-points from the number of post-trigger data-points, where in both cases the specified number corresponds to the group-delay (i.e. the value of the group-delay). As a result, the analog trigger signal may be correctly correlated with other ATEs. This adjustment may be possible as long as the requested number of pre-trigger and post-trigger data-points is greater than the value of the group delay. In general, whether digitized or not digitized, analog triggers may be treated as signals in the ASD and translated to the ADD.

Synchronization with Other Devices

Delta-Sigma ADCs may not be synchronized as slaves to the other type of devices, but they may designated as the master device for timing, and the other devices may use the sample clock provided by the master device as an asynchronous timing signal. Referring again to FIGS. 3*a*/*b* and 4, the ATE designated as master device may provide its sample clock to all other devices via exported sample clocks block 308. As previously shown, the sample clock may assert at the same clock edge as the time when it is seen internally in the ATE. The exported sample clock may be gated by the Start and Stop Trigger pulses. That is, the ATE may be operated to export its sample clock only while it is acquiring data. This makes it possible to synchronize with other devices without requiring precise trigger sharing, which may be difficult since the other devices may not have the DDS clock or the synchronization clock.

System Operation

Figure 9:
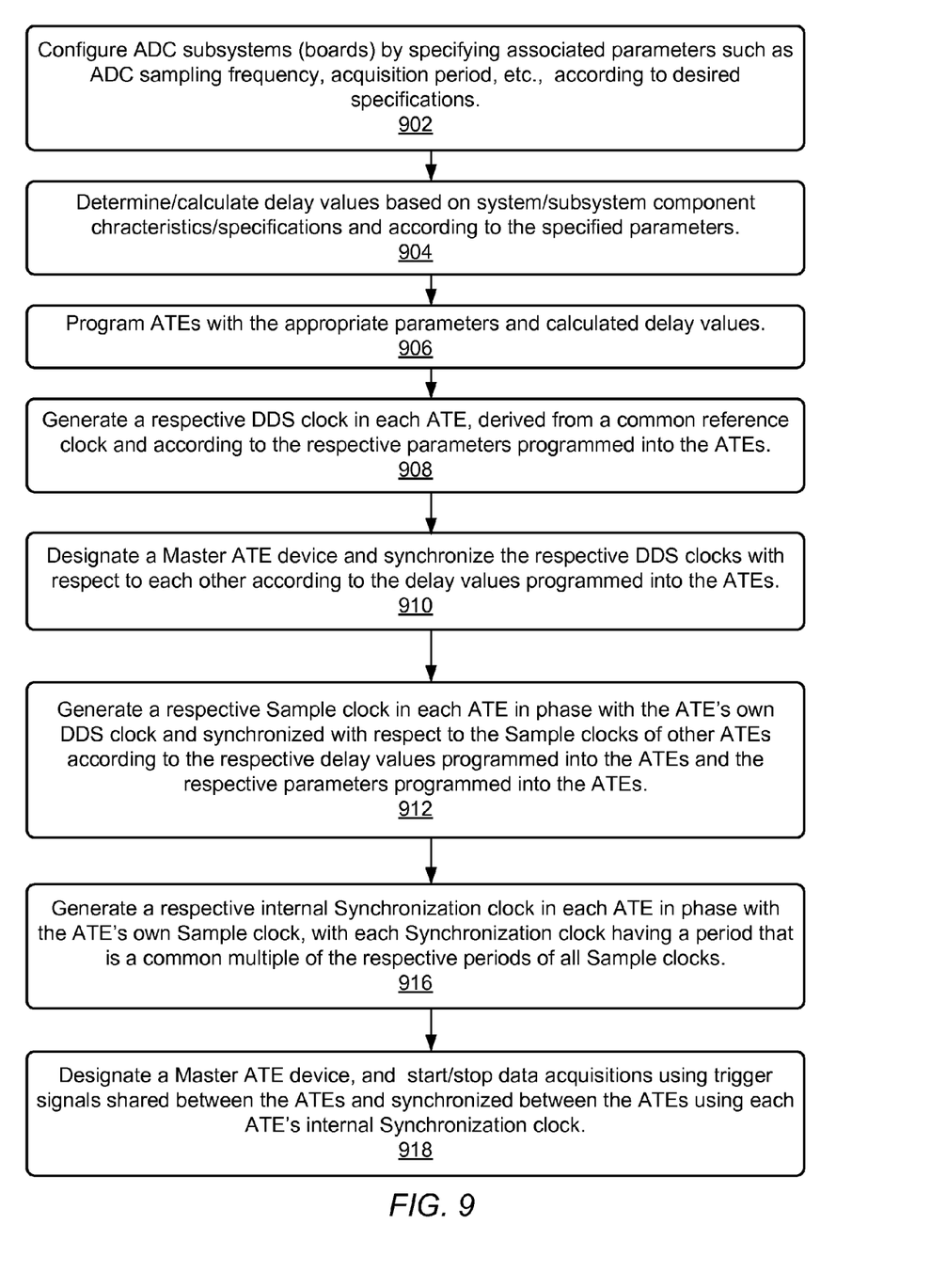
FIG. 9 shows a flow diagram illustrating operation of a data acquisition system using multiple ATEs, according to one embodiment.

FIG. 9 shows a flow diagram illustrating how data acquisition (DAQ) systems using ATEs may be operated, according to one embodiment. First, each subsystem (e.g. DAQ board in a DAQ chassis) containing an ATE and corresponding ADC or ADCs may be configured by specifying required parameters such as ADC sampling frequency, acquisition period, etc., according to desired specifications (902). Once the system has been thus configured, associated delay values may be determined/calculated based on the respective specifications/characteristics of various system/subsystem components and the specified parameters (904). Once the delay values have been determined, the ATEs may be programmed with the appropriate parameters and calculated delay values (906). Once it has been programmed, each ATE may begin generating a respective DDS clock derived from a common reference clock provided to the ATEs, and according to the respective parameter programmed into the ATE (908). The DDS clock may have a frequency that is a non-integer fraction of the frequency of the common reference clock. In some cases, the DDS clock may have a frequency that is an integer fraction of the frequency of the common reference clock, in which case the DDS clock may be generated in phase with the common reference clock. A Master ATE device may then be designated, and the respective DDS clocks of the ATEs may be synchronized with respect to each other according to the delay values programmed into the ATEs (910). With their DDS clocks synchronized, each ATE may generate a respective Sample clock in phase with the ATE's own DDS clock and synchronized with respect to the Sample clocks of other ATEs according to the respective delay values programmed into the ATE and the respective parameters programmed into the ATE (912). With their respective Sample clocks synchronized, each ATE may generate a respective internal Synchronization clock in phase with the ATE's own Sample clock, with each Synchronization clock having a period that is a common multiple of the respective periods of all Sample clocks (916). Once all clock signals have been generated and synchronized, data acquisitions may be performed by once again designating a Master ATE device, and starting/stopping data acquisitions using trigger signals shared between the ATEs and synchronized between the ATEs using each ATE's internal Synchronization clock (918).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for synchronizing operation of a plurality of devices, the method comprising:
   each device generating a respective first periodic signal according to respective operating parameter values associated with the device, and derived from a common reference periodic signal;
   synchronizing the respective first periodic signals with respect to each other according to respective operating delay values associated with each device;
   each device generating a respective sample periodic signal in phase with its respective first periodic signal and according to its associated respective operating parameter values;
   synchronizing the respective sample periodic signals with respect to each other and according to the respective operating delay values associated with each device; and
   each device generating a respective synchronization periodic signal in phase with its respective sample periodic signal.

2. The method of claim 1, further comprising the plurality of devices performing data acquisitions according to trigger signals shared between the plurality of devices.

3. The method of claim 2, wherein the plurality of devices performing data acquisitions comprises synchronizing each of the trigger signals between the plurality of devices using each device's respective synchronization periodic signal.

4. The method of claim 2, wherein the plurality of devices performing data acquisitions comprises starting data acquisitions and stopping data acquisitions according to the trigger signals shared between the plurality of devices.

5. The method of claim 1, wherein the period of each respective synchronization periodic signal is a common multiple of the respective periods of all respective sample periodic signals.

6. The method of claim 1, further comprising determining the respective operating delay values associated with each device based on respective specifications and characteristics of the device and the respective operating parameter values associated with the device.

7. The method of claim 6, further comprising programming each device with the respective operating delay values associated with the device.

8. The method of claim 1, further comprising programming each device with the respective operating parameter values associated with the device.

9. The method of claim 1, wherein each device comprises a converter and a timing engine configured to control operation of the converter.

10. A timing engine for controlling operation of a converter to perform data acquisition, the timing engine comprising:
    a first signal-generating block configured to generate a base periodic signal;
    a synchronization block configured to synchronize the base periodic signal with respect to respective base periodic signals generated by other similar timing engines;
    a second signal-generating block configured to generate a sample periodic signal in phase with the base periodic signal and synchronized with respect to respective sample periodic signals generated by the other similar timing engines; and
    a timing-and-triggering block configured to generate a synchronization periodic signal in phase with the sample periodic signal;
    wherein the timing engine is configured to use the synchronization periodic signal to synchronize acquisition of data output by the converter with respect to acquisitions of data output by converters controlled by the other similar timing engines.

11. The timing engine of claim 10, wherein the first signal-generating block is configured to receive a reference periodic signal and derive the base periodic signal from the reference periodic signal according to operating parameter values associated with the timing engine.

12. The timing engine of claim 10, wherein the synchronization block is configured to receive a reference pulse and synchronize the base periodic signal with respect to the respective base periodic signals generated by other similar timing engines according to the reference pulse and a periodic signal latency value associated with the timing engine.

13. The timing engine of claim 12, wherein the timing engine is configured to generate and provide a reset signal to the converter to reset the converter, according to the reference pulse, the periodic signal latency value, and operation-delay values associated with the converter.

14. The timing engine of claim 10, wherein the second signal-generating block is configured to generate the sample periodic signal according to:
    operating parameter values associated with the timing engine;
    a periodic signal latency value associated with the timing engine; and
    operation-delay values associated with the converter.

15. The timing engine of claim 10, wherein the timing engine is configured to generate a clock signal based on the base periodic signal, and provide the clock signal to the converter, wherein the converter is configured to sample data at a rate coincident with the frequency of the clock signal.

16. A method for acquiring data output by a converter, the method comprising:
    communicating with devices external to the converter in a sample clock time domain defined by a sample clock, wherein the sample clock is asserted at specific points in time corresponding to points in time when the converter actually samples data;
    communicating with the converter in a data time domain defined by specific points in time when data from the converter actually becomes available; and
    translating events recognized during said communicating with devices external to the converter to events in the data domain for said communicating with the converter, by delaying the recognized events based on a group-delay associated with the converter;
    wherein said communicating with the converter comprises acquiring the data output by the converter according to the translated events.

17. The method of claim 16, wherein said communicating with the converter comprises one or more of:
    generating and providing a reset signal to the converter to reset the converter according to a converter reset delay associated with the converter; or
    generating and providing a periodic signal to the converter, wherein the converter is configured to sample data at a rate coincident with the frequency of the periodic signal.

18. The method of claim 16, wherein a rate at which the sample clock is asserted corresponds to a rate at which the data output by the converter is acquired.

19. The method of claim 16, wherein said communicating with devices external to the converter comprises receiving a trigger signal corresponding to a request for initiating said acquiring the data output by the converter.

20. The method of claim 19, wherein said communicating with devices external to the converter further comprises returning the acquired data output by the converter on a next edge of the sample clock subsequent to said receiving the trigger signal.

* * * * *